United States Patent [19]

Georgiadis et al.

[11] Patent Number: 5,283,897
[45] Date of Patent: Feb. 1, 1994

[54] SEMI-DYNAMIC LOAD BALANCER FOR PERIODICALLY REASSIGNING NEW TRANSACTIONS OF A TRANSACTION TYPE FROM AN OVERLOAD PROCESSOR TO AN UNDER-UTILIZED PROCESSOR BASED ON THE PREDICTED LOAD THEREOF

[75] Inventors: Leonidas Georgiadis, Chappaqua; Christos N. Nikolaou, New York; George W. Wang, Yorktown Heights, all of N.Y.

[73] Assignee: International Business Machines Corporation, Armonk, N.Y.

[21] Appl. No.: 516,642

[22] Filed: Apr. 30, 1990

[51] Int. Cl.[5] .............................................. G06F 15/00
[52] U.S. Cl. .................................... 395/650; 395/800; 364/281; 364/281.6; 364/281.3; 364/281.4; 364/281.5; 364/DIG. 1; 364/975.5
[58] Field of Search ................... 395/800, 650, 50, 51, 395/54

[56] References Cited

U.S. PATENT DOCUMENTS 4,920,487 4/1990 Baffes ................................ 395/650

OTHER PUBLICATIONS

Ciciani et al, "Load Sharing in Hybrid Distributed—Centralized Database Systems", 1988, pp. 274-281.

*Primary Examiner*—Thomas C. Lee
*Assistant Examiner*—Paul Harrity
*Attorney, Agent, or Firm*—Whitham & Marhoefer

[57] ABSTRACT

A semi-dynamic load balancer for a transaction processing system reallocates transaction types among computers in the system as a group rather than as individual transactions. Statistical data is accumulated in an affinity matrix which records the number of times a transaction type i was blocked by transaction type j was holding a lock on a data item that transaction type i wanted to access. When an overloaded computer is detected, transaction types are reallocated on the computers of the system according to a transaction type routing table which is updated based on data from the affinity matrix.

7 Claims, 4 Drawing Sheets

SEMI-DYNAMIC LOAD BALANCER FOR PERIODICALLY REASSIGNING NEW TRANSACTIONS OF A TRANSACTION TYPE FROM AN OVERLOAD PROCESSOR TO AN UNDER-UTILIZED PROCESSOR BASED ON THE PREDICTED LOAD THEREOF

BACKGROUND OF THE INVENTION

1. Field of the Invention

The present invention generally relates to a load balancer for a system of computers interconnected by a communications link and having access to a shared data base and, more particularly, to a load balancer which reallocates transaction types between computers of the system by keeping information about lock contention between transaction types so that no excessive overhead is generated in the system when a transaction type is moved from one computer to another. By transaction type, what is meant is all incoming requests that are associated with a program stored in the system that is the embodiment of the transaction. A transaction type is usually identified with a name (i.e., code) to the system by which the association is made to the program.

2. Description of the Prior Art

Transaction processing systems are on-line, application-oriented systems typically implemented on a multiprocessor data processing system supporting a plurality of terminals, often distributed over a large geographical area. A typical transaction processing system is IBM's ACP (for Airline Control Program) which, although classically used in airlines reservations systems, has been used in other systems, notably by banks in on-line teller applications. The entire system including computers, terminals, shared data base, communication links and the like, is referred to herein as a system of computers or simply as the system.

High performance transaction processing systems are increasingly used by large organizations. In a typical large installation, thousands of transaction types may be defined, although only a few hundred of them are frequently used. The arrival rate of the commonly used transaction types may fluctuate for various reasons; e.g., seasonally, specific hours of the day, or even randomly. In addition, computers of the system may be added or taken away, or fail. Other applications (program development, other interactive users) may at times demand a bigger share of the system machines.

These environmental changes may seriously overload certain computers of the system and result in a dramatic performance (response time and/or throughput) degradation of certain transaction types running on the overloaded processors. In such a system, it is vital that processing be performed with maximum efficiency. This requires some sort of load balancing among the several computers in the system.

Load balancers are known in the art. Static load balancers are manually tuned by a system operator (a human) who observes how work is apportioned among the computers in a system and, based on his observations, tunes the system in order to even out the load. The balancing is fixed when the system is in operation and thus the system cannot respond to unusual circumstances or changes in the system's usage patterns. If changes are deemed to be necessary, because of failures or slow response times, operator intervention is required and, in the worst case, the system must be shut down while the operator retunes it.

Static allocations for jobs and/or transactions have been proposed in the literature. Characteristics of arriving jobs and the computer systems typically constitute static information. In case some of the system parameters, e.g., the job/transaction arrival rate, vary gradually with time, such parameters may be estimated and used for improved job/transaction routing. Still, rerouting is triggered by human observation and decision. The policy in this case is termed to be quasi-static or quasi-dynamic, as described by A. Kumar and F. Bonomi in "Adaptive Load Balancing in a Heterogeneous Multiserver System with a Central Job Scheduler", *Proc. of the 8th Int'l Conf. Distributed Computing Systems*, June 1988, pp. 500-508. There are the following varieties of static routing:

1. Probabilistic routing. A fraction of jobs are routed to each computer system according to Bernoulli trials. The probability of being routed to each system is pre-computed to optimize a certain performance measure, such as equalization of processor utilizations at all systems, minimization of the expected overall response time, or equalization of expected response time systems at all systems. The criterion of minimization of the expected overall response time has been considered by J. P. Buzen and P. P. S. Chen, *Information Processing* 74, pp. 271-175, North Holland, N.Y. (1974), for centralized arrivals, and by A. N. Tantawi and D. Towsley in "Optimal Static Load Balancing in Distributed Computer Systems", *Journal of the ACM*, 32(2):445-465 (1985), for distributed arrivals. The criterion of equalization of expected response time systems at all systems has been considered by L. Georgiadis, C. Nikolaou and A. Thomasian in "a Fair Workload Allocation Policy for Heterogeneous Systems", IBM T. J. Watson Research Center, RC 14323 (1988).

2. Deterministic routing. In the case of two homogeneous servers, a round-robin routing scheme is optimal, provided that the initial state is identical (e.g., both servers are idle). This is described by A. Ephremides, P. Varaiya and J. Walrand in "A Simple Dynamic routing Problem", *IEEE Transactions on Automatic Control*, AC-25(4):690-693, August 1982.

Dynamic load balancers have also been proposed that are fully dynamic; i.e., they reassess the need for load balancing after each transaction. Such systems require such a large amount of overhead that they are not practical. In other words, it takes a lot of processor power to implement dynamic load balancing, processor power that would otherwise be devoted to processing the actual transactions. It should be noted that the dynamic load balancers discussed in the literature have not yet been built. In the article by S. P. Yu, S. Balsamo and Y. H. Lee entitled "Notes on Dynamic Load Sharing and Transaction Routing", IBM Research, RC 11537 (1985), a routing decision is made for each message arriving at the distributed system, but these decisions tend to be expensive especially for "short" transactions. P. Krueger and M. Livny in "When is the Best Load Sharing Algorithm a Load Balancing Algorithm?", Computer Sciences Dept., University of Wisconsin, Madison, April 1987, study a variety of algorithms combining a local scheduling policy, such as FIFO (first in, first out) or processor sharing, with a global scheduling policy, such as load sharing and load balancing. If the global scheduling policy is to give work to idling processors, then the policy is one of load sharing, whereas load balancing is performed when the policy is to keep the load of the processors balanced. Several other researchers have proposed dynamic algorithms using the same assumptions. See, for example, M. Livny and M. Melman, "Load Balancing in a Homogeneous Distributed System", *Proceedings of the ACM Computer Networks Performance Symposium*, April 1982, D. L. Eager, E. D. Lazowska and J. Zahorjan, "Dynamic Load Sharing in Homogeneous Distributed Systems", University of Saskatchewan Tech. Report 84-10-01, October 1984, R. M. Bryant and R. A. Finkel, "A Stable Distributed Scheduling Algorithm", *Proc. of the Second International Conf. on Distributed Computing Systems*, April 1981, and A. Barak and A. Shiloh, "A Distributed Load-balancing Policy for a Multicomputer", *Software-Practice and Experience*, 15(9):901-913, September 1985. Some of these algorithms use process pre-emption when performing process migration. This option is not available to use in on-line transaction processing systems. Whereas it may be sensible to pre-empt executing on an overloaded processor and migrate it to an underloaded processor, it is impractical in a transaction environment because of the transaction management overhead.

All of the above work, however, does not address the case of transactions that interfere with each other because of contention. This is an important consideration because even if transactions are routed to processors so that the load generated by their arrival rates is roughly equalized among processors, the overhead generated by data contention may be such that the resulting load is still unbalanced and the overall throughput is greatly reduced.

Static optimization algorithms have been devised to minimize the cost of transaction communication (or interference if the transactions share data) under processor capacity constraints. Examples are described by W. W. Chu, M. Lan and J. Hellerstein, "Estimation of Intermodule Communication (IMC) and its Applications in Distributed Processing Systems", *IEEE Transactions on Computers*, C-33, August 1984, and P. S. Yu, D. W. Cornell, D. M. Dias, and B. R. Iyer, "Analysis of Affinity Based Routing in Multi-System Data Sharing, IBM Research, RC 11424 (1985). At system generation time, however, statistical information about transaction load and communication is usually not known. In addition, frequent load and configuration changes render the optimization algorithms impractical. Their combinatorial explosion has lead researchers to propose efficient algorithms for special cases. Examples are described by G. S. Rao, H. S. Stone and T.C. Hu in "Assignment of Tasks in a Distributed Processor System with Limited Memory", *IEEE Transactions on Computers*, C-28(4), April 1979, and H. S. Stone in "Multiprocessor Scheduling with the Aid of Network Flow Algorithms", *IEEE Transactions on Software Engineering*, SE-3(1), January 1977.

A. Thomasian and P. Bay in "Data Allocation Heuristics for Distributed Systems", *Proc. of the EEE INFOCOM 1985*, pp. 118-129 (1985), present interchange and clustering heuristics combined with queuing network modelling of a transaction processing system that can yield response time estimates for a specific allocation. A. Dutta, G. Koehler and A. Whinston in "On Optimal Allocation in a Distributed Processing Environment", *Management Science*, 28(8):839-853, August 1982, start with partial assignments (maps) and augment them by calculating estimated best completion. Clustering of transactions has been proposed by V. B. Gylys and J. A. Edwards in "Optimal Partitioning of Workload for Distributed Systems", *Proceedings of COMPCON Fall 1976*, (1976), who use centroids, but their algorithm is sensitive to the initial formation of clusters. K. Efe in "Heuristic Models of Task Assignment Scheduling in Distributed Systems", *Computer*, June 1982, proposes his own clustering algorithm by pairs and assignment algorithm of clusters to processors. S. H. Bokhari in "On the Mapping Problem", *IEEE Trans. on Computers*, C-30(3), March 1981, presents heuristics (link interchanges) for maximizing the number of edges of the problem graph that are mapped on edges of an array processor. The algorithm appears to work well, although there is no comparison with the optimal assignment. It appears to have special applicability to numerical problems with a periodical problem graph mapped on parallel machines (e.g., NASA's Finite Element Machine).

SUMMARY OF THE INVENTION

It is therefore an object of the present invention to provide a load balancer for shared data base transaction processing systems which redistributes transaction types to equalize processor load by collecting processor utilization information from the computers of the system.

It is another object of the invention to provide a semi-dynamic load balancer for a multi-computer transaction system which responds to workload changes by redistributing transaction types to computers to achieve a balanced load.

It is a further object of this invention to provide an iterative process to incrementally improve load balancing in a system using a scheme of transaction types grouped according to categories.

According to the invention, a load balancer which is neither dynamic nor static, but rather semi-dynamic (or semi-static) is provided. That is, the load balancer according to the invention periodically reviews the workload situation and makes adjustments as required. As a result of its semi-dynamic nature, it can observe and predict trends, since it observes large numbers of transactions and not just one transaction at a time. Neither the static or fully dynamic load balancer can predict trends. Also, the semi-dynamic load balancer of this invention uses far less overhead than a fully dynamic load balancer and therefore permits more productive use of the processor resources. In the preferred embodiment, a single front-end processor acts as the sole transaction router, but the invention is extensible to the case where there are multiple transaction routers. A straight-forward extension would be to run the reallocation algorithm in just one transaction router and then distribute its new routing decisions to the remaining routers.

In addition to the semi-dynamic feature of the present invention, the load balancer also reassigns transactions based on the transaction type. This is done to avoid lock contention and deadlock. For example, a given transaction type is likely to address the same memory and/or direct access storage device (DASD) addresses. If all of these types of transactions reside on the same processor, locks from other processors are avoided.

The invention implements an iterative process based on a scheme of category weighted transaction types to incrementally improve load balancing in a system of computers which access a shared data base. More specifically, transaction types are divided in three subsets. The first of these is all transactions types such that if a single type is removed from an overloaded computer the utilization on that computer would fall below a predetermined threshold. The second is all transaction types such that if one is removed from an overloaded computer, the utilization of that computer would be reduced but would not fall below the threshold. The last is all transaction types such that if one of them is removed from an overloaded computer, the utilization of that computer would increase as a result of interprocessor contention activity.

Transaction types from the first subset are the first candidates for reallocation, and of these candidates, the candidate with the smallest lock contention is selected first. The selected candidate transaction is reallocated to the computer in the system in which the predicted change in loading factor is minimum. If no candidate computer is found, the process is repeated with the next transaction type from the first subset. If all transactions in the first subset are examined, the process is repeated with the transactions in the second subset. If no single transaction is found appropriate, pairs of transactions are considered and so forth until either an appropriate computer is found, the search limit is reached, or there is no computer that can accommodate any node.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
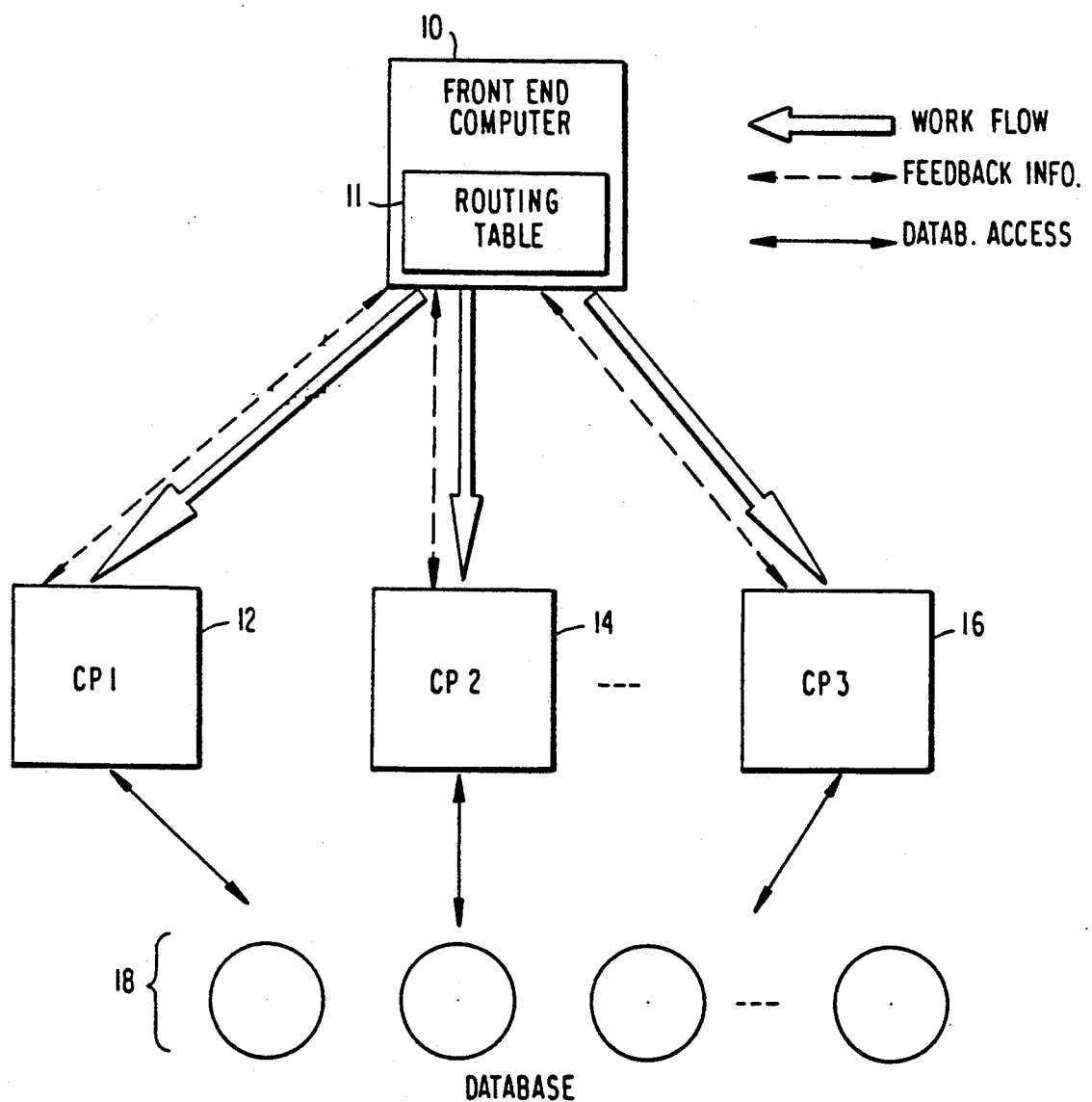
FIG. 1 is a block diagram of the system configuration of a system on which the invention is implemented.

Referring now to the drawings, and more particularly to FIG. 1, there is shown a system consisting of one front end computer 10 and a plurality of back end computers 12, 14 and 16, which share a common data base, here represented as a plurality of DASDs (direct access storage devices) 18. A global lock manager is used to assure the proper sharing of the database. Transactions arrive for processing at the front end computer 10, which distributes them to the back end computers 12, 14 and 16, in accordance with a routing table 11 with the objective of maximizing throughput. The routing table 11 is stored in memory in the front end computer 10 and is periodically updated in accordance with the load balancing algorithm implemented by the present invention.

Each transaction belongs to one of J transaction types. Transactions belonging to the same type have similar processing requirements and are accessing the same part of the database 18. For purposes of this disclosure, it is assumed that migration of individual transactions is not allowed; i.e., a transaction completes processing on the computer on which it has been routed by the front end computer 10.

According to the invention, a load balancing algorithm is applied to the front end computer 10. The objective is to provide a simple, low overhead procedure that will ensure high transaction throughput. It is assumed that the main resource for which there is contention in a computer is the central processing unit (CPU) and that the basic consumers of this resource are the transactions (including the processing done on behalf of a transaction by other "service" routines such as the database manager) and the global lock manager.

Figure 2:
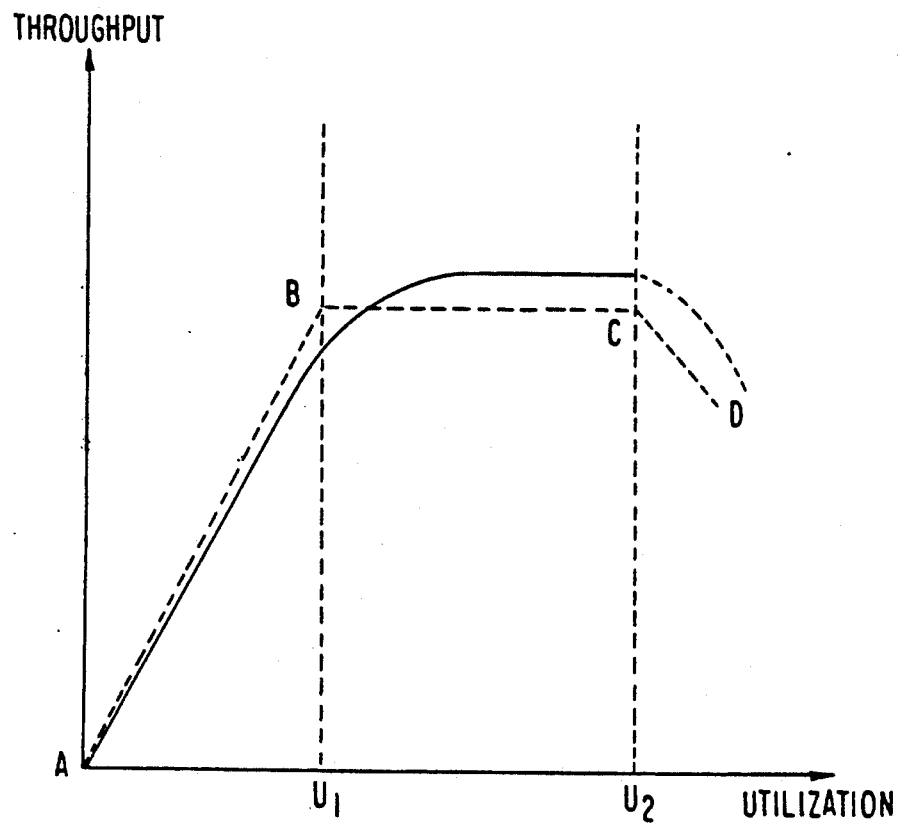
FIG. 2 is a graph showing the relationship of throughput as a function of processor utilization.

It has been observed experimentally and verified analytically that as long as the CPU utilization remains lower than a threshold, $U_1$, the throughput of a computer system increases approximately linearly with the CPU utilization. In this case, the system is able to process all the incoming load, and the throughput is equal to the arrival rate. By increasing the CPU utilization above the threshold $U_1$, only minor increases in throughput can be achieved, while after a threshold $U_2$ is crossed, the throughput decreases. The behavior of the system for utilizations above U is due to the fact that the system cannot accommodate all the incoming load (i.e., the system is overloaded), and most of he CPU time is spent by the system routines to manage the queues, overfilled buffers, etc. During the period when the system is overloaded, throughput is smaller than the arrival rate. A typical CPU utilization versus throughput curve is shown in FIG. 2. The dashed lines correspond to an approximation of the curve by a linear segment with positive slope, AB, a flat line, BC, and a linear segment with negative slope, CD. In the following discussion, the segment AB is referred as the "normal region" of the operation of the computer system.

Figure 3:
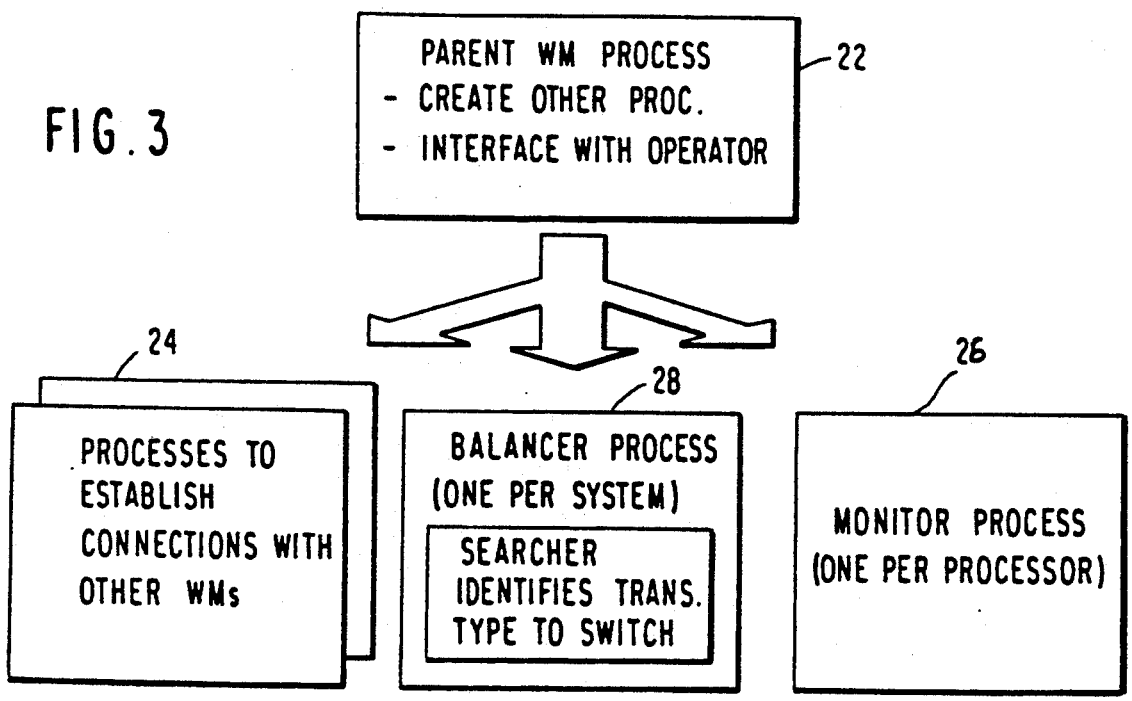
FIG. 3 is a block diagram of the workload manager process structure.

FIG. 3 shows the process structure of the work load manager. On each computer in the system, the parent workload manager process 22 is initialized first and provides an interface with the operator. It also spawns processes 24 that establish connections through communication links with other workload managers residing on different machines. Next, a monitor process 26 is activated on each machine that processes transactions. A balancer process 28 is activated on front end computer 10. This process is responsible for making the decisions to reallocate transaction types. The monitor process 26 wakes up periodically and examines the CPU busy time accumulated since the last time the monitor was active. The monitor process 26 also examines the lock contention information for the affinity matrix. The balancer process 28 also wakes up periodically to examine the utilization values sent by the monitors of the system. Based on this information, the balancer process 28 makes a decision whether one or more of the computers will be characterized as an overloaded computer. For each computer which is overloaded, transaction types are considered for switching from that computer to an under utilized computer. The criteria for switching which are examined by the balancer process 28 are (1) which transaction types are best suited for switching and (2) to which computer in the system should they be switched. If different transaction types take different amounts of time to execute and are submitted at different rates, it is clear that their relative load is also different. Experimental results suggest that transaction type response time and throughput is affected by how transaction types are redistributed. In addition, if transaction types that access the same databases are routed to different computers, lock contention and the likelihood of deadlock may rise dramatically. This is avoided in the present invention by affinity based routing.

For the system shown in FIG. 1 consisting of more than one computer and a given transaction load to be processed by the system, it is clear that the throughput will be maximized if it is possible to allocate the load so that all computers operate in their normal region. This observation is the basis of the algorithm that is implemented by the invention. That algorithm is that distribution and redistribution of the load to the computers will be made so that the utilization of all the units will stay below a given threshold. Due to the fact that the normal region is not a straight line but a convex function, some improvement may be expected by applying more sophisticated algorithms that redistribute the load even when all units operate within their normal region, but improvement in this case will not be significant enough to justify the increased system complexity and overhead.

The algorithm allocates all transactions that belong to a particular transaction type to a specific computer. The reasons for this choice are:
1. Transactions belonging to the same type are more likely to access the same part of the database. Therefore, when two transactions of the same type are processed at the same time by two different computer systems, the likelihood for lock contention and deadlock increases.
2. Transactions belonging to the same type have similar characteristics and, therefore, statistics collected on a transaction-type basis are more meaningful and reliable.

Whenever a transaction requests access to a part of the database that is being locked by another transaction, an amount of CPU processing is required to process the lock-conflict. Let $c_s$ and $c_d$ be the amount of processing required when the lock conflict takes place on the same and different computer systems, respectively. It is assumed that $c_s < c_d$, which is the case in most practical systems. The amount of processing required to process a lock depends on the type of lock (read, write), granularity (page-level, record-level) and the algorithms used. To simplify the discussion, it is also assumed that $c_s$ and $c_d$ are measured as the average of the processing required to process a lock in the same and in different computers, respectively. This last assumption can be relaxed to consider the processing requirements of the different types of locks; the algorithm implemented by the invention remains the same, but the amount of information that needs to be gathered increases.

Let $n_{ij}$ be the average number of times a transaction of type i is blocked due to the fact that a lock is held by a transaction type j. The matrix with typical element $n_{ij}$ is defined as the affinity matrix. The CPU time to process the lock, $s_{ij}$, will be "charged" to transaction i. Using the previous definitions, $$s_{ij} = \begin{cases} c_s n_{ij} \text{ if both transactions are on the same computer} \\ c_d n_{ij} \text{ if the transactions are on different computers} \end{cases} \quad (1)$$

Assume now that an allocation of transaction types to processors has been given. Let $s_i$ be the average CPU processing time required by a transaction type i, and let $P_i$ be the computer on which this transaction type is processed. If $P^c_i$ denotes the rest of the computers (i.e., $P^c_i = \{1, \ldots, N\} - \{P_i\}$), then the CPU processing time required by a transaction type i is $$S_i = s_i + \sum_{j \in P_i} s_{ij} + \sum_{j \in P^c_i} s_{ij} \quad (2)$$

If $\lambda_i$ is the arrival rate of transaction type i, then the utilization of computer P is given by $$\rho_P = \sum_{i \in P} \lambda_i S_i \quad (3)$$

Assume now that computer P is over utilized, that is, $\rho_P > U_1$. The objective to the front end computer 10 is to try to reduce the utilization of computer P by reallocating transaction types from P to some other computer that is under utilized. By simply reallocating any transaction type, however, the situation may not improve because of the following conditions.
1. If the wrong transaction type is reallocated, the lock conflicts may increase, therefore increasing the processing requirements to resolve conflicts. The net effect may be that the utilization of computer P will increase.
2. The utilization of the computer Q to which the load is reallocated may increase beyond the threshold $U_1$, in which case the problem is simply moved from computer P to computer Q. This phenomenon is known as thrashing.

From the above, it may be seen that careful reallocation of the transaction types is needed to assure that utilization of the processors will remain below the specified threshold.

The algorithm implemented by the invention attempts to reduce the utilization of the overloaded processors by reallocating as few transaction types as possible. In fact, a single transaction type is reallocated at each step. The reason is that such a reallocation simplifies the algorithm and reduces the overhead incurred due to the need to bring new programs into main memory and new control blocks to process the new transaction types on the processors on which they will be allocated. In addition, this stepwise approach allows for the gathering of meaningful statistics about the transaction types between successive type reallocation. There is also an implicit assumption here that there is no predominant transaction type in the installation such that its allocation on a particular computer would by itself overload that computer.

Assume that transaction type I is reallocated from computer P to computer Q. The processing of requirements of a transaction $j \in P$ will become $$S_j^1 = S_j + n_{j1}c_d - n_{j1}c_s, \quad j \in P \quad (4)$$

and, therefore, the utilization of computer P will become $$\rho_P^1 = \sum_{j \in P - \{1\}} S_j^1 = \rho_P + \sum_{j \in P - \{1\}} \lambda_j n_{j1}(c_d - c_s) - \lambda_1 S_1 \quad (5)$$

The new processing requirements of a transaction of type $j \in Q$ are $$S_j^1 = S_j - n_{j1}C_d + n_{j1}c_s, \quad j \in Q \quad (6)$$

while the new processing requirements of a transaction type 1 are $$S_1^1 = S_1 + \sum_{j \in P-\{1\}} n_1(c_d - c_s) - \sum_{j \in Q} n_1(c_d - c_s) \qquad (7)$$

Therefore, the utilization of computer Q will become $$\rho_Q^1 = \sum_{j \in Q\{1\}} S_j^1 \qquad (8)$$

$$\rho_Q^1 = \rho_Q - \sum_{j \in Q} \lambda_j n_{j1}(c_d - c_s) + \sum_{j \in P\{1\}} \lambda_1 n_{1j}(c_d - c_s) -$$

$$\sum_{j \in Q} \lambda_1 n_{1j}(c_d - c_s) + \lambda_1 S_1$$

The CPU utilization of the rest of the computers will not be affected. Since the term $(c_d - c_s)$ is positive, it can be seen from equation (5) that by simply reallocating a transaction type, there is no guarantee of a decrease in CPU utilization at computer P. Similarly, from equation (8) it can be seen that reallocation of a transaction type to a target computer Q may be beneficial for computer Q under certain circumstances.

The change in CPU utilization of a computer can be easily computed once the parameters $n_{ij}$, $i=1,\ldots,N$ and $j=1,\ldots,N$, and $s_{ij}$, $i=1,\ldots,N$, are given. These parameters are statistical quantities that are measured by the back end computers and are sent to the front end computer. Specifically, if W denotes the time interval during which the averages are measured, $n_{ij}$ is computed as follows:

$$\rho_Q^1 = \sum_{j \in Q\{1\}} S_j^1 \qquad (8)$$

$$\rho_Q^1 = \rho_Q - \sum_{j \in Q} \lambda_j n_{j1}(c_d - c_s) + \sum_{j \in P\{1\}} \lambda_1 n_{1j}(c_d - c_s) -$$

$$\sum_{j \in Q} \lambda_1 n_{1j}(c_d - c_s) + \lambda_1 S_1$$

The quantity $n_{ij}$ is computed in the back end computers and sent to the front end computer. The front end computer computes the quantity $$n_{ij} = \frac{\text{\# of times transaction of type } i \text{ requested lock held by transaction of type } j}{\text{\# of transactions of type } i \text{ during } W} \qquad (9)$$

The quantity $n_{ij}$ is computed in the back end computers and sent to the front end computer. The front end computer computes the quantity $$s_i = \frac{\text{total CPU time allocated to type } i \text{ during } W}{\text{\# of transactions of type } i \text{ served in } W} \qquad (10)$$

The parameters $c_d$ and $c_s$ are relatively constant and do not need to be updated frequently. They can be computed either as average CPU consumption over time interval, or they can be estimated from the number of instructions needed to process a lock.

The foregoing description explains the effect of transaction type reallocation on CPU utilization and identifies the parameters needed by the front end computer to calculate the new utilization. In the following description, there is presented the algorithm used to reallocate specific transaction types based on the previous calculations.

At time T, let $\mathcal{H}^o$, ($\mathcal{H}^u$) be the set of computers for which $\rho_P \geq U_1$, ($\rho_P < U_1$). The objective is to decide (1) which transaction type(s) from computer(s) $P \in \mathcal{H}^o$ will be reallocated and (2) to which computer(s) $Q \in \mathcal{H}^u$ these transaction types will be reallocated so that the utilizations of all the computers in $\mathcal{H}^o$ will fall below $U_1$ while the utilization of all the computers in $\mathcal{H}^u$ will stay below $U_1$. Of course, this may not possible always, and even if there is a feasible reallocation, it may be too costly to examine all the possibilities in order to find the appropriate one. On the other hand, since decisions are taken in relatively short time intervals, it is not necessary to find the "best" policy, but only to improve the situation in gradual steps with small overhead. This is the basic motivation for the algorithm implemented by the invention.

Let $P \in \mathcal{H}^o$. For a transaction type $1 \in P$, the following quantity is computed:

$$D_1 = \sum_{j \in P-\{1\}} \lambda_j n_{j1}(c_d - c_s) - \lambda_1 S_1 \qquad (11)$$

Based on the computed $D_1$, the transaction types in P are divided in three subsets:

1. Subset P(1) consists of all transaction types such that $D_1 < (U_1 - \rho_P) < 0$; i.e., all types, such that if a single type is removed from an overloaded computer P, the utilization on that computer would fall below the threshold $U_1$.
2. Subset P(2) consists of all transaction types such that $(U_1 - \rho_P) \leq D_1 < 0$; all types such that if one is removed from an overloaded computer P, the utilization of that computer would be reduced but would not fall below the threshold $U_1$.
3. Subset P(3) consists of all transaction types such that $0 \leq D_1$; i.e., all types such that if one of them is removed from an overloaded computer P, the utilization of that computer would increase as a result of interprocessor contention activity.

Reallocation of a single transaction type from subset P(1) will reduce the utilization of computer below threshold $U_1$ as desired. Therefore, transaction types from subset P(1) are the first candidates for reallocation. The next question is which one of these candidates will be selected. Observe that the first term on the right hand side of equation (11) is due to lock contention between the reallocated transaction types and the types that remain in the currently overloaded computer. Since this utilization corresponds to system work to resolve conflicts and not to work dedicated to make progress, it is preferable to keep it small. Therefore, the candidate with the smallest $$C_1 = \sum_{j \in P-\{1\}} \lambda_j n_{j1}(c_d - c_s) \qquad (12)$$

will be selected first.

To decide to which computer the chosen transaction type will be allocated, the increase in load, $I_{1Q}$, that would result form reallocating the transaction type 1 to computer Q is computed as follows:

$$I_{1Q} = \sum_{j \in P-\{1\}} \lambda_1 n_{1j}(c_d - c_s) - \sum_{j \in Q} \lambda_j n_{j1}(c_d - c_s) - \qquad (13)$$

-continued $$\sum_{j \in Q} \lambda_1 n_{1j}(c_d - c_s) + \lambda_1 S_1$$

Any computer for which $I_{1Q} \leq U_1 - \rho_Q$ is a candidate for accepting the reallocated transaction type. Following the reasoning above, the computer Q is chosen for which the following quantity is minimum:

$$F_{1Q} = \sum_{j \in P - \{1\}} \lambda_1 n_{1j}(c_d - c_s) - \sum_{j \in Q} \lambda_j n_{j1}(c_d - c_s) - \sum_{j \in Q} \lambda_1 n_{1j}(c_d - c_s) \quad (14)$$

If no candidate computer is found, the process is repeated with the next transaction type from subset P(1). If all transactions in subset P(1) are examined, the process is repeated with the transactions types in subset P(2). If none of the transactions in subset P(2) is appropriate, or if the subset P(2) is empty, then no single transaction type reallocation is appropriate. A transaction type 1 may not be appropriate for relocation from computer P to computer Q because (1) the "individual" load of the transaction type, i.e., $\lambda_1 S_1$ is large enough that $\rho_Q + \lambda_1 S_1 > U_1$, and (2) transaction type 1 is interfering strongly with at least another transaction type in computer P and, therefore, its reallocation will increase the utilization of computer Q due to the need to resolve conflicts. There is nothing that can be done in the first case; however, in the second case the possibility exists that if another transaction type, say k, is also reallocated to computer Q, its CPU utilization will be reduced. Even though it is likely that case (1) will occur more frequently in practice, there should be a mechanism to resolve case (2) if it occurs.

If no single transaction is found appropriate, pairs of transactions are considered as follows. The transaction with the smallest lock contention overhead $C_1$ is picked. The remaining transactions are sorted on the overloaded computer P in descending order, according to the quantity $n_{1m} + n_{m1}$, $m \in P - \{1\}$, where m is a transaction type on computer P; i.e., the transaction types are sorted according to the volume of their interference with 1. The transaction type t on the top of the sorted list becomes the partner of transaction type 1. The process is then repeated as follows. Transaction type 1 is moved along with its partner t as if it were a single transaction type. Then, if a suitable computer is found, the process stops and the pair is reallocated; otherwise, the list is again accessed for the first two transactions, say $t_1$ and $t_2$, to form a triplet with 1, and the process is repeated. If this does not work, the process can continue with quadruplets and so forth up to some limit imposed by overhead considerations. The process stops when either an appropriate computer is found, the search limit is reached, or there is no computer that can accommodate any transaction or group of transactions.

Figure 4A:
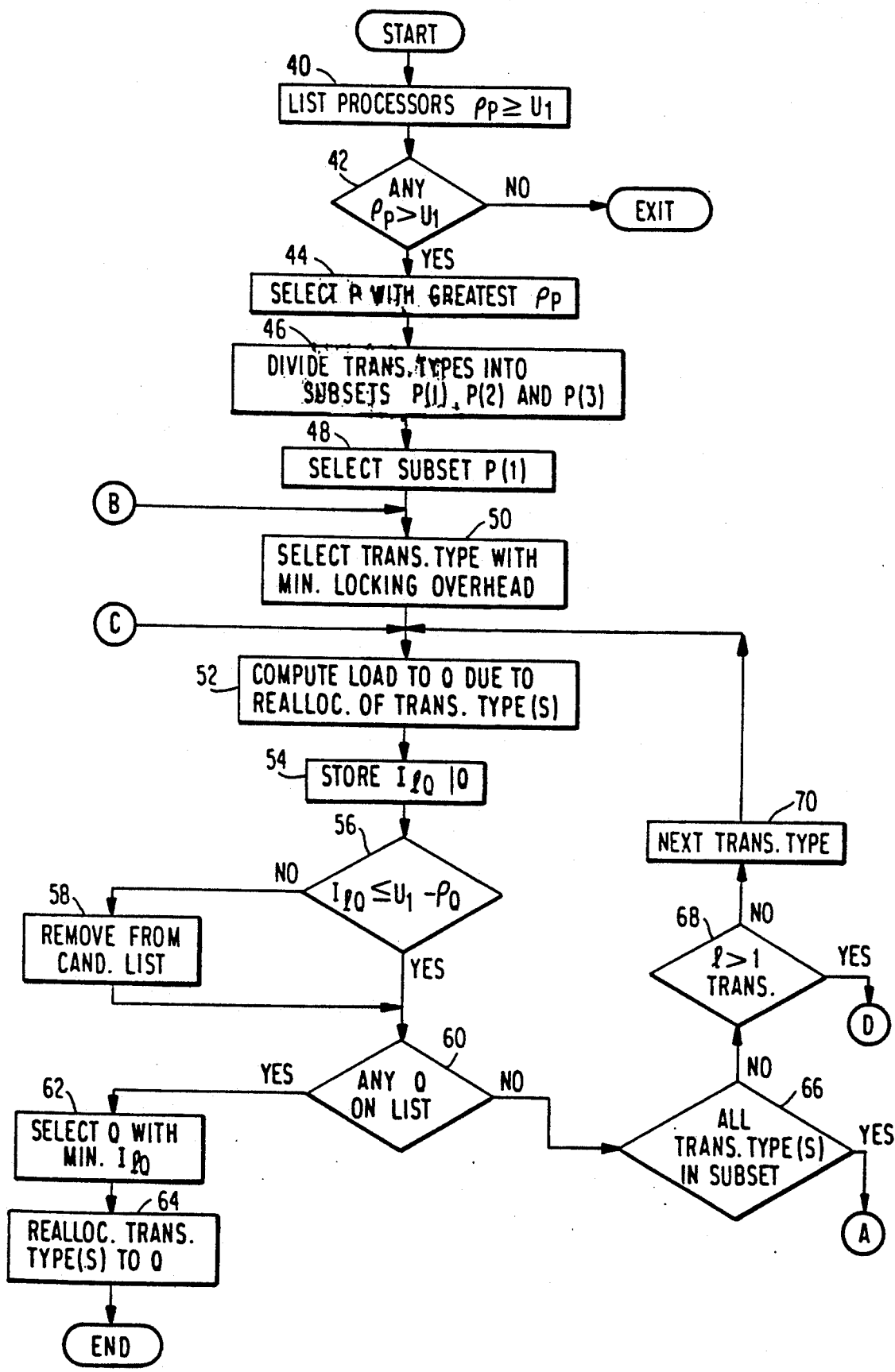
FIGS. 4A and 4B, taken together, are a flow chart showing the process implemented according to the invention.
Figure 4B:
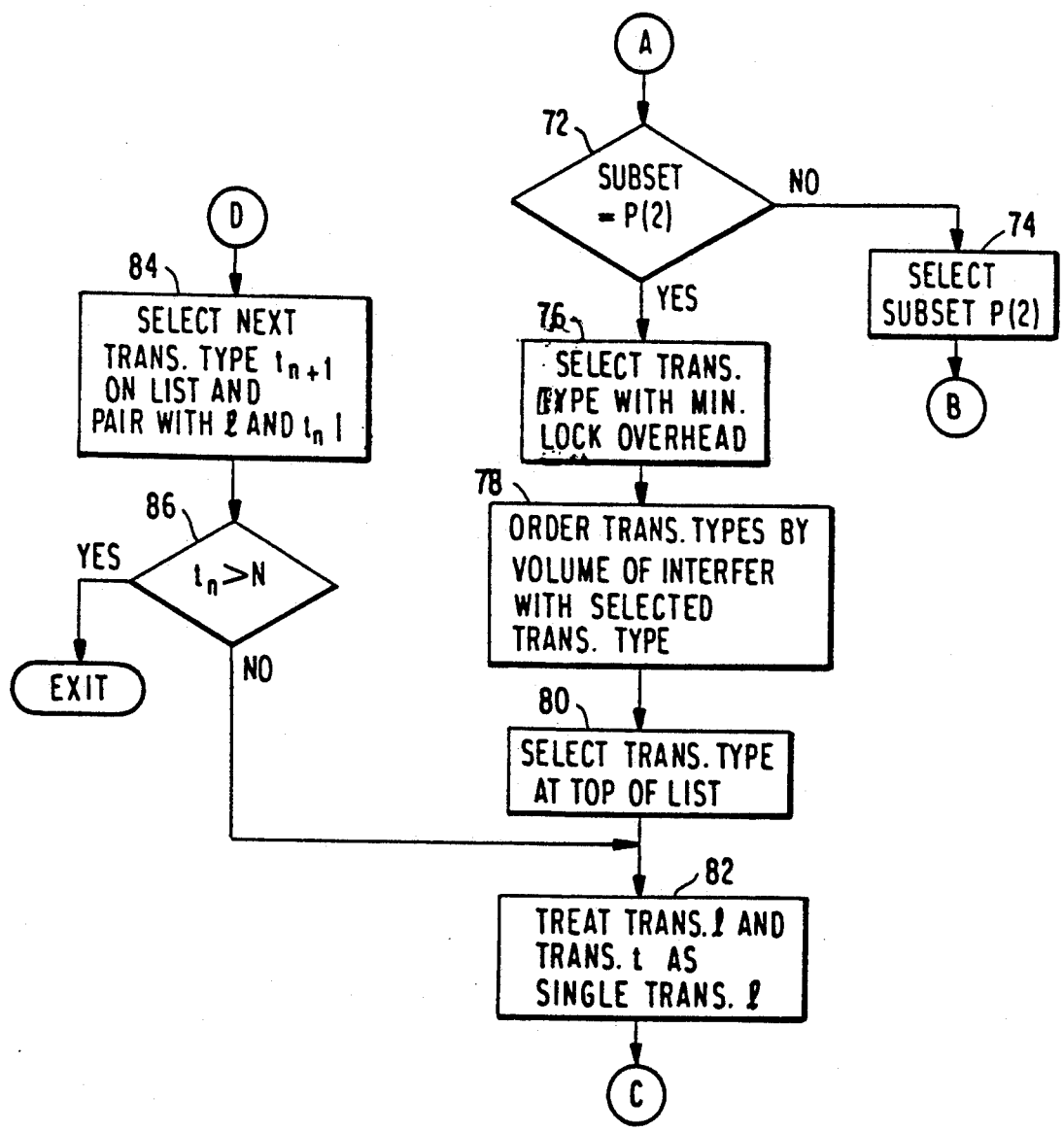

FIGS. 4A and 4B are a flow chart illustrating the reallocation process according to the present invention. The process shown is illustrative of the preferred embodiment, but it will be recognized by those skilled in the art that variations of this process can be readily implemented. As previously mentioned, the quantities $n_{ij}$, the affinity matrix elements of the average number of times a transaction of type i is blocked due to a lock held by a transaction of type j, and $s_{ij}$, the CPU time to process the lock, are measured by the back end computers and transmitted to the front end computer. The process at the front end computer begins in function block 40 by testing the utilization of each computer against the threshold U and temporarily storing values of computer utilization, with the computer name, which exceed the threshold. If it is determined in decision block 42 that there are no such values, i.e., none of the computers is overloaded, then the process exits; otherwise, the computer P with the greatest over load is selected in function block 44. The transactions on computer P are then divided into subsets P(1), P(2) and P(3) in function block 46. Initially, the transactions in subset P(1) are selected in function block 48, and then in that subset, the transaction type with the smallest locking overhead is selected in function block 50 as the candidate transaction type to be reallocated.

For those computers which are not over loaded, the increase in load resulting from reallocating the candidate transaction type to each computer is computed in function block 52, and the computed increases in loads, with the computer names, are temporarily stored in function block 54. Then, in decision block 56, the computed increases in loads are compared with the threshold less the computer's current utilization. Those computers for which the increase in load is less than the threshold less the current utilization are identified as candidate computers in function block 58. If there are any candidate computers, as determined in decision block 60, then the computer Q with the minimum increase in load due to the reallocation of the candidate transaction type is selected in function block 62, and the transaction type is then reallocated to that computer in function block 64, ending the process.

If no candidate computer remains, as determined in decision block 60, then a test is made in decision block 66 to determine if all transactions in the subset have been tried. If not, and if only a single transaction type is being considered, as determined in decision block 68, the next transaction in the subset is selected in function block 70, before control returns to function block 52. If all the transactions in the subset have been tried as determined in decision block 66, and if the exhausted subset is not P(2) as determined in function block 72, subset P(2) is selected in function block 74, before control returns to function block 50.

If on the other hand all transactions of subsets P(1) and P(2) have been tried and no candidate computer is found to reallocate transactions to, no tests are made of subset P(3) because by definition removal of one of the transaction types in this subset would increase, rather than decrease, processor utilization. Instead, control goes from decision block 72 to function block 76 where the transaction type with the smallest locking overhead is selected. Then, in function block 78, the remaining transaction types are ordered in a list according to the volume of interference with the selected transaction. If this is the first iteration, then the transaction type t at the top of the list is selected in function block 80 and paired with the transaction type 1, and the pair are treated as a single transaction type l in function block 82 before control is returned to function block 52. On the next iteration where l is more than one in decision block 68, the next transaction type in the list is selected in function block 84 so that transaction type 1 is paired with transaction types $t_1$ and $t_2$ to form a triplet to be treated as a single transaction type l, and so on. There is generally a practical limit to how far this iteration can be carried, and therefore a test is made in decision block 86 to determine if the number of transaction types which have been selected exceeds a predefined limit. If it does, the process exits.

The following pseudocode implements the reallocation process shown in FIGS. 4A and 4B.

```
|*Initialization Phase*|
Eligible₁=yes |*Initially, all transaction types
   are eligible for reallocation*|
Find the back-end computer P with the highest CPU
utilization.
If ρP<U₁ then stop.
Divide the set of transactions allocated to P into
subsets P(1), P(2), P(3).
|*Main Phase of the Algorithm*|
|*The outermost loop is executed more than once
   only if no single transaction type can be
   reallocated to an under utilized machine; in
   that case, groupings of one, two, ..., etc.
   transactions are formed, with high affinity
   between then (high interference), and the
   algorithm tries to reallocated the group*|
|*Try transactions in each of the subsets P(1),
   P(2)*|
SETS: do for i=1 to 3;
   if(L=1 and i=3) then leave SETS; |*no need to
      test P(3)*|
   Ph(i)={transaction types in P(i) with
      Eligible₁≠no};
   do while Ph(i) is nonempty;
      find the transaction type l∈Ph(i) with the
smallest locking overhead Cl;
      if L>1 then do; |*The if condition is true if
         no single transaction type reallocation is
         acceptable*|
         |*Beginning of Grouping*|
         sort transaction types m∈P−{l} in decreasing
            order of n₁ₘ + nₘ₁,
         consider l and the first L−1 of the sorted
            transaction types as a single transaction
            type l;
         do for j=1 to J; |*Computer n_lj for the new
            transaction type*|
```

$$n_{lj} = n_{1j} + \sum_{k=1}^{L-1} n_{kj}; \quad n_{jl} = n_{j1} + \sum_{k=1}^{L-1} n_{jk};$$

end;

$$s_l = s_1 + \sum_{k=1}^{L-1} s_k + \sum_{k+1}^{L-1} n_{1k}c_s + \sum_{k=1}^{L-1}\sum_{q=1}^{L-1} n_{kq}c_s;$$

$$\lambda_l = \lambda_1 + \sum_{k=1}^{L-1} \lambda_k;$$

```
      compute Cl;
      |*End of Grouping*|
      else do
         l=1;
      endif;
|*Reallocation of transaction type l is attempted
   in block of code labelled REALLOC*|
   REALLOC: do for Q∈{1,..., N}−P;
      if Eligible₁Q=no the iterate;
      computer I_lQ;
      if I_lQ≤U₁−ρQ then do;
         allocate transaction type l to processor Q
            such that F_lQ is minimum;
         P←P−{l}; Q←Q ∪{l};
         if ρP<U₁ then stop;
         else Reallocation_of_Type_l_Complete=yes;
      end;
      if Reallocation_of_Type_l_Complete=yes then
         leave REALLOC;
      if λ_Sl>U₁−ρQ, then Eligible₁Q=no
      end REALLOC;
|*This point is reached if either an appropriate
   computer was not found to reallocate the
   transaction type, or a computer was found but
   the utilization of P is still over U₁*|
      if Eligible₁Q=no,   Q∈{1,...,N}−P then
         Eligible₁=no;
         Ph(i)←Ph(i)−{l};
      endo;
   endo SETS;
   L=L+1; |*Increase grouping size and iterate*|
endo;
```

In summary, the invention resides in the following features:
1. The use of semi-dynamic load balancing;
2. The reallocation of transaction types as a group, and not individual transactions;
3. The creation and maintenance of an affinity matrix that records the number of times transaction type i was blocked by transaction type j because transaction type j was holding a lock on a data item that transaction type i wanted to access; and
4. An algorithm that rearranges transaction types on computers if at least an overloaded computer is detected, based on data from the affinity matrix.

While the invention has been described in terms of a single preferred embodiment, those skilled in the art will recognize that the invention can be practiced with modification within the spirit and scope of the appended claims.

We claim:

1. A semi-dynamic load balancer for a transaction-type computer system having multiple processors and a shared database, said load balancer reassigning transaction types to respective ones of said multiple processors to balance respective loads of said multiple processors; the load balancer comprising:
   routing means connected to said multiple processors for assigning new transactions of a same type to a processor of said multiple processors according to a routing table;
   monitoring means connected to said multiple processors for periodically determining whether a load imbalance has occurred among said processors, said monitoring means including threshold means for determining whether a processor utilization of one of said multiple processors exceeds a predetermined threshold; and
   reallocation means connected to and responsive to said monitoring means and including lock contention means for determining a predicted load to a candidate processor of said multiple processors for a possible reassignment of said new transactions of said same type of said one of said multiple processors having a processor utilization exceeding said predetermined threshold; said reallocation means updating said routing table to thereby automatically reassign said new transactions of said same type to said candidate processor of said multiple processors.

2. A semi-dynamic load balancer for a multi-computer, shared database transaction processing system, said load balancer reassigning transactions to balance loads of respective ones of said computers, the load balancer comprising:
   routing means connected to said processing means for assigning new transactions of a same type to a common computer in accordance with a transaction type routing table;

statistical means connected to said processing system for creating and maintaining an affinity matrix that records the number of times a transaction type i was blocked by transaction type j because said transaction type j was holding a lock on a data item in said shared database that said transaction type i wanted to access;

monitoring means connected to said processing system for periodically checking for an over loaded computer in said system; and reallocation means, connected to and responsive to said monitoring means, using said affinity matrix for predicting an expected change in a contention related loading factor for each said computer for various possible reassignments of transaction types, said reallocation means making one or more changes in said transaction type routing table based on said predicted expected change in said contention related loading factor for each said computer for the various possible reassignments of transaction types, said routing means thereafter automatically reassigning new transaction types from an over loaded computer to an under utilized computer in accordance with said routing table.

3. The semi-dynamic load balancer for a multi-computer transaction processing system as recited in claim 2 wherein one of the computers in said multi-computer system is designated as a front end computer and others of said multi-computer system are designated as back end computers, said routing means being installed on said front end computer and said monitoring means being installed on each of said back end computers, said system further including communication link means interconnecting said back end computers to said front end computers and said monitoring means periodically transmitting data to said front end computer, said statistical means being installed on said front end computer and generating said affinity matrix from said data transmitted by said back end computers.

4. A transaction processing system comprising:
a plurality of computers sharing a common database, said plurality of computers being interconnected via communication links, one of said computers being a front end computer and others of said computers being back end computers;

routing means at said front end computer for assigning new transactions of a same type to one of said back end computers in accordance with a transaction type routing table;

means at each of said back end computers for periodically accumulating statistical data on the respective back end computer's work load and transmitting the statistical data to said front end computer;

load balancing means at said front end computer for periodically analyzing said statistical data from said back end computers; wherein said load balancing means including statistical means for creating and maintaining an affinity matrix that records the number of times a transaction type i was blocked by transaction type j because said transaction type j was holding a lock on a data item in said shared common database that said transaction type i wanted to access, said load balancing means using said affinity matrix for predicting an expected change in a contention related loading factor for each said back end computer for various possible reassignments of transaction types and making one or more changes in said transaction type routing table based on said predicted expected change in said contention related loading factor for each said back end computer for the various possible reassignments of transaction types;

said routing means thereby automatically reassigning transaction types from an over loaded back end computer to an under utilized back end computer in accordance with said transaction type routing table as updated.

5. In a transaction processing system of the type having a plurality of computers sharing a common database, said plurality of computers being interconnected via communication links, each of said computers processing one or more transaction types, at least one of said computers being a front end computer and others of said computers being back end computers, a load balancing system for said back end computers comprising:

routing means at said front end computer for assigning new transactions of a same type to one computer of said back end computers in accordance with a transaction type routing table;

monitoring means at each of said back end computers for accumulating statistical data on the back end computer's work load and periodically transmitting said statistical data to said front end computer;

load balancing means at said front end computer for periodically analyzing said statistical data and identifying ones of said back end computers having a processor utilization exceeding a predetermined threshold, said load balancing means selecting one of said back end computers with a greatest utilization exceeding said threshold and selecting a transaction type as a candidate transaction type for reallocating to another one of said back end computers;

said front end computer including calculating means for calculating an increase in loading to those back end computers having a processor utilization not exceeding said threshold due to reallocation of said candidate transaction type and then determining those of said back end computers for which the increase in loading plus current processor utilization do not exceed said threshold, said computers being candidate computers for reallocation of said candidate transaction type;

said load balancing means selecting one of said candidate computers for which the calculated increase in loading is a minimum and reassigning said candidate transaction type to the selected candidate computer by updating said transaction type routing table.

6. The load balancing system as recited in claim 5 wherein said load balancing means includes statistical means for creating and maintaining an affinity matrix that records the number of times a transaction type i was blocked by transaction type j because said transaction type j was holding a lock on a data item in said shared common database that said transaction type i wanted to access, said load balancing means using said affinity matrix for predicting an expected change in a contention related loading factor for each said back end computer for various possible reassignments of transaction types and making one or more changes in said transaction type routing table based on said predicted expected change in said contention related loading factor for each said back end computer for the various possible reassignments of transaction types.

7. The load balancing system as recited in claim 5 wherein if there is not single transaction type which can be reallocated to achieve processor utilization below said threshold, said balancing means selecting more than one transaction type as a candidate transaction type for reallocation to another back end computer and said calculating means calculating an increase in loading to those back end computers having a processor utilization not exceeding said threshold due to reallocation of said candidate transaction type comprising more than one transaction type.

* * * * *